United States Patent
Van Os et al.

(10) Patent No.: US 7,873,475 B2
(45) Date of Patent: Jan. 18, 2011

(54) DEVICE AND METHOD OF MEASURING DEPTH AND AZIMUTH

(75) Inventors: Roel Van Os, Bourg la Reine (FR); Dominique Dion, Plasir (FR); Philip Cheung, Montesson (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 286 days.

(21) Appl. No.: 12/159,556

(22) PCT Filed: Jan. 8, 2007

(86) PCT No.: PCT/EP2007/000093

§ 371 (c)(1),
(2), (4) Date: Jun. 27, 2008

(87) PCT Pub. No.: WO2007/080080

PCT Pub. Date: Jul. 19, 2007

(65) Prior Publication Data

US 2009/0012710 A1   Jan. 8, 2009

(30) Foreign Application Priority Data

Jan. 10, 2006   (EP) .................................. 06290061

(51) Int. Cl.
    *G06F 19/00* (2006.01)
(52) U.S. Cl. .......................................................... 702/6
(58) Field of Classification Search ................ 702/6, 702/182–185, 188
    See application file for complete search history.

(56) References Cited

U.S. PATENT DOCUMENTS

| 4,251,773 A | 2/1981 | Cailliau et al. |
| 5,812,068 A | 9/1998 | Wisler et al. |
| 5,930,730 A | 7/1999 | Marfurt et al. |
| 6,151,961 A | 11/2000 | Huber et al. |
| 2006/0271299 A1 * | 11/2006 | Ward et al. ..................... 702/6 |

FOREIGN PATENT DOCUMENTS

EP   0541425   5/1993

* cited by examiner

*Primary Examiner* — Edward Raymond
(74) *Attorney, Agent, or Firm* — Matthias Abrell (57) ABSTRACT

A method of measuring depth and/or azimuth of logging data, the logging data being related to at least one property of a zone GF, CS, CA surrounding a wellbore and being measured by at least a sensor array SA1D, SA2D, the method comprising the steps of:

acquiring and storing a first logging data frame F11, F21 corresponding to a first position of the sensor array, acquiring and storing a second logging data frame F12, F22 corresponding to a second position of the sensor array, the first and second position are such that the second logging data frame F12, F22 overlaps at least partially the first logging data frame F11, F21, comparing the first F11, F21 and second F12, F22 logging data frame, and calculating a relative change in the depth $\Delta DP$ and/or azimuth $\Delta AZ$ of logging data measured by the sensor array SA1D, SA2D between the first F11, F21 and second F12, F22 logging data frame.

13 Claims, 7 Drawing Sheets

DEVICE AND METHOD OF MEASURING DEPTH AND AZIMUTH

FIELD OF THE INVENTION

The invention relates to a method of measuring depth and/or azimuth of logging data related to a physical property of a geological formation surrounding a wellbore measured by at least a sensor array, and a device for measuring depth and azimuth according to the same method.

Other aspects of the invention relate to a logging tool and a drilling assembly.

A particular application of the method and the logging tool according to the invention relates to the oilfield services industry.

BACKGROUND OF THE INVENTION

Many techniques are known to measure the depth as well as the azimuth of downhole assemblies deployed within a wellbore. The downhole assemblies may be a logging tool (used in wireline application) or a drilling assembly (used in drilling and logging while drilling applications) which comprise a plurality of sensors for measuring properties of the geological formation surrounding the wellbore.

Typically, in wireline application, the logging tool is connected to a surface equipment via a logging cable. The depth of the logging tool is determined by means of a calibrated measure wheel at the surface. The wheel has a known circumference and is rotated by the logging cable when the logging tool is run into the wellbore. The depth may be corrected by taking into account the stretch of the cable due to the weight of the cable in the wellbore, the weight of the logging tool and the history of the cable stretch characteristics change with usage.

Typically, in logging while drilling application, the drilling assembly is connected to a surface equipment via a drill string. The depth of the drilling assembly is determined by measuring the length of pipe that enters the well at surface. The depth may be corrected for the effects of drill string tension or compression.

During the deployment and operation of the logging tool and drilling assembly, these downhole assemblies may move erratically within the well bore (e.g. bouncing effects, sticking and releasing effects, friction, compression or tension of the pipe or cable). Thus, it is often difficult to estimate at a particular instant the precise depth of the downhole assembly. In addition, in logging while drilling application, an additional error is introduced by the lack of synchronization between the uphole and downhole clocks. As a consequence, log produced by the sensors of the downhole assembly will be incorrect as a result of the errors made when correlating measurements performed by the sensors of the downhole assembly with depth measurements made at the surface. Further, the aforementioned estimated depths will be insufficiently precise for high resolution measurements such as images.

SUMMARY OF THE INVENTION

It is an object of the invention to propose a depth and/or azimuth measuring device and method that overcomes at least one of the drawbacks of the prior art.

According to an aspect, the invention relates to a method of measuring depth and/or azimuth of logging data related to a physical property of a geological formation surrounding a wellbore measured by at least a sensor array, the method comprising the steps of:

acquiring and storing a first logging data frame corresponding to a first position of the sensor array, and acquiring and storing a second logging data frame corresponding to a second position of the sensor array, the first and second position are such that the second logging data frame overlaps at least partially the first logging data frame, comparing the first and second logging data frame, and calculating a relative change in the depth and/or azimuth of logging data measured by the sensor array between the first and second logging data frame.

Optionally, the method may further comprise a step consisting in calculating an actual depth value and/or an actual azimuth value of logging data based on the relative change in the depth and/or azimuth of logging data and a prior estimation of the depth and/or azimuth of logging data.

The step of comparing the first and second logging data frame may consist in determining an overlapping area between both logging data frames. Hence, the displacement of one frame relative to the other can be determined.

The step of determining the overlapping area may consist in either evaluating the coherence of the logging data frames by applying a correlation method on both logging data frames, or alternatively evaluating the similarity of the logging data frames by applying a semblance method on both logging data frames.

Optionally, the method may further comprise the step of correcting the prior estimation of the depth and/or the prior estimation of the azimuth of logging data based on a measurement made by a surface depth measuring system or a weight on tool measuring system.

The logging data may be mechanical, electromagnetic, nuclear or acoustic measurements.

The first and second logging data frames may 1D images or 2D images.

According to another aspect, the invention relates to a computer program product for a depth and/or azimuth measuring device arranged to be deployed into a wellbore, the computer program product comprising a set of instructions that, when loaded into a program memory of the depth and/or azimuth measuring device, causes the depth and/or azimuth measuring device to carry out the steps of the method of measuring depth and/or azimuth of logging data according to the invention.

According to a further aspect, the invention relates to a device for measuring depth and/or azimuth of logging data, the device being coupled to at least a sensor array for measuring logging data related to at least one property of a zone surrounding a wellbore, and comprising a memory buffer and at least one a processing module, wherein the processing module of the depth and/or azimuth measuring device is arranged to:

acquire and store into the memory buffer a first logging data frame corresponding to a first position of the sensor array and a second logging data frame corresponding to a second position of the sensor array, the second logging data frame overlapping at least partially the first logging data frame, compare the first and second logging data frame, and calculate a relative change in the depth and/or azimuth of logging data between the first and second logging data frame.

Optionally, the processing module of the depth and/or azimuth measuring device may be further arranged to calculate an actual depth value and/or an actual azimuth value of logging data taking into account the relative changes in the depth and/or azimuth of logging data and any prior estimation of the depth and/or azimuth of logging data.

The sensor array may be a 1D sensor array or a 2D sensor array.

According to still a further aspect, the invention relates to a logging tool arranged to be deployed into a wellbore and comprising at least a sensor array for measuring logging data related to at least one property of a zone surrounding a wellbore, wherein the logging tool comprises the depth and/or azimuth measuring device of the invention.

According to still a further aspect, the invention relates to a drilling assembly arranged to drill a wellbore and comprising at least a sensor array for measuring logging data related to at least one property of a zone surrounding a wellbore, wherein the drilling assembly comprises the depth and/or azimuth measuring device of the invention.

Thus, the invention enables an accurate estimation of the relative depth and/or the relative azimuth of a downhole assembly moving in an open or cased wellbore at each moment in time.

The measurements used to determine the relative depth and/or azimuth may be the primary measurements of a downhole assembly (e.g. the measurements related to the imaging of geological formation resistivity) or may be auxiliary measurements measured by a specific sensor array. In particular, the method of the invention is particularly simple to implement when the measurements of a physical property of the surrounding zone method are themselves used to determine the relative depth and/or the relative azimuth. As a consequence, accurate logs can be produced with the method and device of the invention.

Further, the relative depth and/or azimuth estimated according to the invention can be used to improve the analysis and interpretation of data acquired on the downhole assembly, in particular images and other measurements that require knowledge of the relative positions of the data acquired.

Finally, the invention also enables determining the absolute depth and/or the absolute azimuth of a downhole assembly.

These and other aspects of the invention will be apparent from and elucidated with reference to the embodiments described hereinafter.

BRIEF DESCRIPTION OF THE DRAWINGS

The present invention is illustrated by way of example and not limited to the accompanying figures, in which like references indicate similar elements:

FIG. 1.A schematically illustrates a typical onshore hydrocarbon well location and a logging application of the invention;

FIG. 1.B schematically illustrates a typical onshore hydrocarbon well location and a logging while drilling application of the invention;

FIG. 2.A is a cross-section into a portion of a cased wellbore schematically illustrating a first embodiment of a device for measuring depth and/or azimuth of logging data according to the invention;

FIG. 2.B is a cross-section into a portion of a cased wellbore schematically illustrating the implementation of the method of measuring depth and/or azimuth of logging data with the first embodiment of the invention shown in FIG. 2.A;

FIGS. 3.A, 3.B and 3.C schematically illustrate a method of measuring depth and/or azimuth of logging data implemented by the first embodiment of the invention shown in FIG. 2.A;

FIG. 4.A is a cross-section into a portion of a cased wellbore schematically illustrating a second embodiment of a device for measuring depth and/or azimuth of logging data according to the invention;

FIG. 4.B is a cross-section into a portion of a cased wellbore schematically illustrating the implementation of the method of measuring depth and/or azimuth of logging data with the second embodiment of the invention shown in FIG. 4.A;

FIGS. 5.A and 5.B schematically illustrate the method of measuring depth and/or azimuth of logging data implemented by the second embodiment of the invention shown in FIG. 4.A;

FIGS. 6.A and 6.B schematically illustrate logging data measured with a logging tool or a drilling apparatus where depth was measured according to the invention and according to the prior art, respectively;

DETAILED DESCRIPTION OF THE INVENTION

In the following description the wording "depth", "azimuth", "property of a zone surrounding a wellbore" will have the following meaning.

The "depth" describes a measure of displacement of a device along a trajectory.

The "azimuth" describes the rotation of the device about the axis of the trajectory, relative to a reference which may be a projection of the gravity or magnetic field vector on a plane perpendicular to said axis.

The "property of a zone surrounding a wellbore" means either:
  in the case of open hole, the physical or geometrical properties of the geological formation,
  in the case of cased hole, the physical or geometrical properties of the pipe, the casing, the cemented annulus or the geological formation behind the casing, The physical or geometrical properties may be measured by, for example, mechanical, electromagnetic, nuclear or acoustic sensors.

Figure 1:
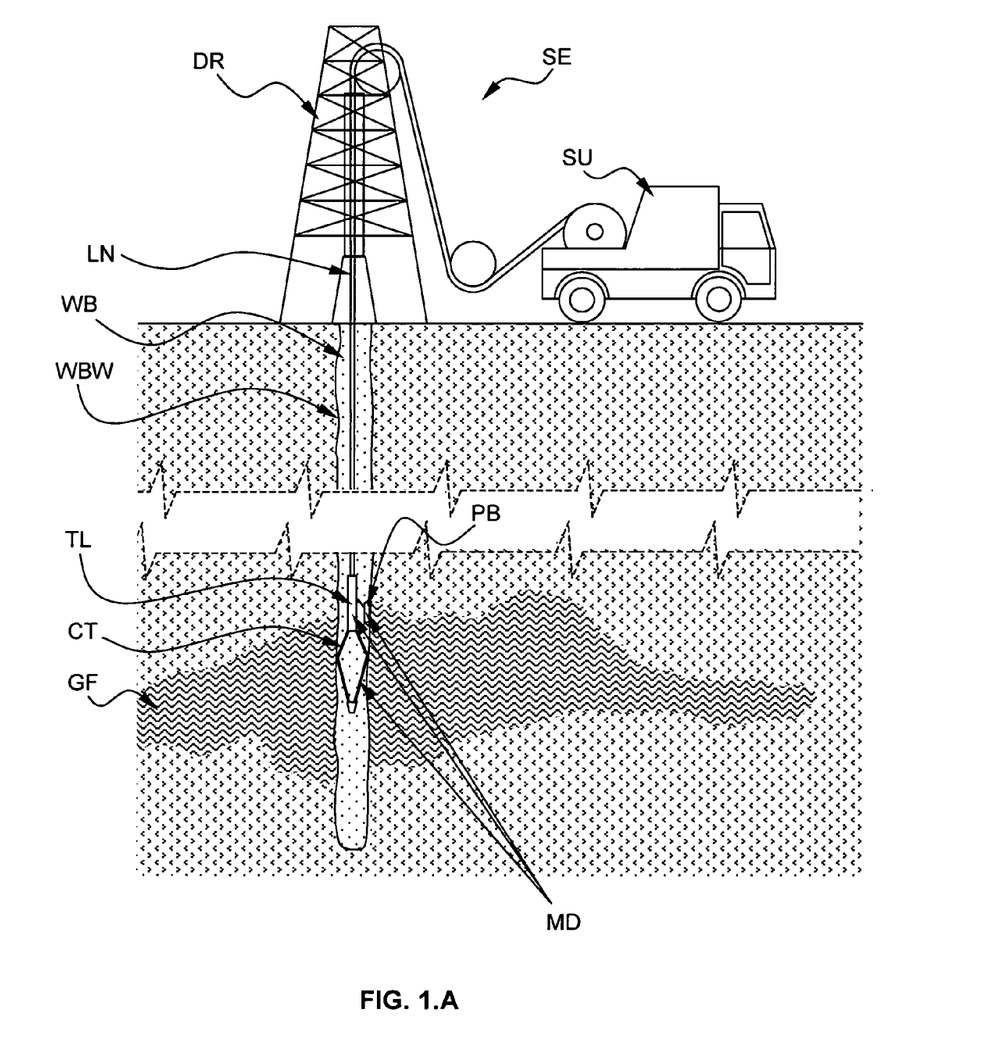

FIG. 1.A schematically shows a typical onshore hydrocarbon well location and surface equipments SE above a hydrocarbon geological formation GF after drilling operation has been carried out. At this stage, i.e. before a casing string is run and before cementing operations are carried out, the wellbore WB is a bore hole filled with a fluid (e.g. a drilling fluid or mud).

Well logging operation may be carried out. The well logging operation serves to measure various parameters of the hydrocarbon well geological formation (e.g. resistivity, porosity, etc. . . . at different depths) and in the well-bore (e.g. temperature, pressure, fluid type, fluid flowrate, etc. . . . at different depths). Such measurements are performed by a logging tool TL. Generally, a logging tool comprises at least one sensor (e.g. resistivity sonde, mechanical sonde, gamma ray neutron sonde, accelerometer, pressure sensor, temperature sensor, etc. . . . ) and measures at least one parameter. It may include a plurality of same or different sensors sensitive to one or more parameters. The logging tool is moved up and down in the borehole by means of a cable LN and gathers data about the various parameters.

The logging tool may be deployed inside the well-bore by an adapted surface equipment SE that may include a vehicle SU and an adapted deploying system, e.g. a drilling rig DR or the like. Data related to the hydrocarbon geological formation GF or to the well-bore WB gathered by the logging tool TL may be transmitted in real-time to the surface, for example to the vehicle fitted with an appropriate data collection and analysis computer and software.

The logging tool TL may comprise a centralizer CT. The centralizer comprises a plurality of mechanical arm that can be deployed radially for contacting the well-bore wall WBW. The mechanical arms insure a correct positioning of the logging tool along the central axis of the well-bore hole. The logging tool TL comprises various sensors and provides various measurement data related to the hydrocarbon geological formation GF, or to the casing that may be present in the borehole, or to the cemented casing. These measurement data are collected by the logging tool TL and transmitted to the surface unit SU. The surface unit SU comprises appropriate electronic and software arrangements for processing, analyzing and storing the measurement data provided by the logging tool TL.

The logging tool TL may also comprise a probe PB for measuring a physical property (e.g. the density) of the subsurface formation surrounding the wellbore. Once the logging tool is positioned at a desired depth, the probe PB can be deployed from the logging tool TL against the bore hole wall WBW by an appropriate deploying arrangement (e.g. an arm).

The device for measuring depth and/or azimuth MD of logging data of the invention may be fitted anywhere on the logging tool TL, including the probe PB and the centralizer CT.

FIG. 1.B schematically shows a typical onshore hydrocarbon well location and surface equipments SE above a hydrocarbon geological formation GF after a well-bore WB drilling operation has been carried out, after a casing string CS has been partially run and after cementing operations have been partially carried out for sealing the annulus CA (i.e. the space between the well-bore WB and the casing string CS) in order to stabilize the well-bore.

Typically, the surface equipments SE comprise a plurality of mud tanks and mud pumps, a derrick, a drawworks, a rotary table, a power generation device and various auxiliary devices, etc. . . .

At this stage, various operations may be carried out, either logging or further drilling operations that are shown in FIG. 1.B.

For example, a logging tool TL may be deployed into a first portion P1 of the well-bore which is a cased portion in order to perform logging operation. The logging tool TL was described in relation with FIG. 1 and will not be further described. The device for measuring depth and/or azimuth MD of logging data of the invention may be fitted within the logging tool TL.

Further, a drilling assembly DA may be deployed into a second portion P2 and a third portion P3 in order to perform further drilling operation. The second portion P2 of the well-bore is an open bore hole. The third portion P3 of the well-bore is a sensibly horizontal lateral bore hole.

The drilling assembly DA is coupled to the surface equipments with a drill string DS. The device for measuring depth and/or azimuth MD of logging data of the invention may be fitted anywhere within the drilling assembly DA in order to perform logging while drilling.

It is emphasized that the surface equipments SE, the logging tool TL and the drilling assembly DA shown in FIGS. 1.A and 1.B may comprise other components that are not shown for clarity reasons.

The measuring device according to a first and second embodiment of the invention that will be described in relation with FIGS. 2.A and 4.A, respectively, may be fitted in any type of downhole assembly (logging tool, drilling assembly, or any other tool conveyed in any other fashion). The downhole assembly may be rotated clockwise or counterclockwise, move up or down into the wellbore resulting in a positive or negative variation of the depth and/or azimuth of the downhole assembly into the wellbore.

Figure 2:
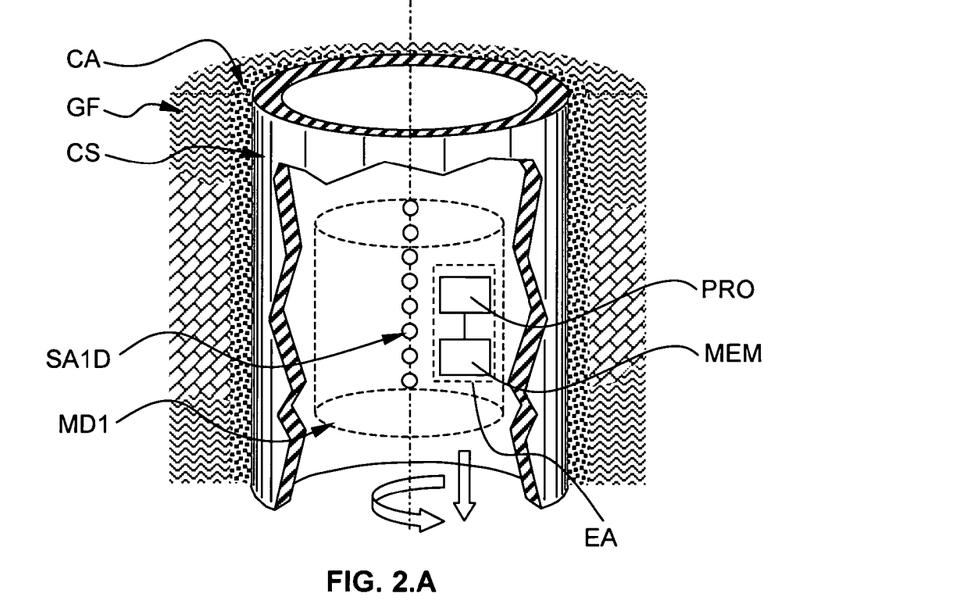

FIG. 2.A schematically shows a cross-section into a portion of a cased wellbore and illustrates the depth and/or azimuth measuring device MD1 according to a first embodiment of the invention.

The depth and/or azimuth measuring device MD1 is coupled to a 1D sensor array SA1D. In the example of FIG. 2.A, the 1D sensor array comprises 8 sensors and is positioned substantially vertically, thus enabling measuring depth. Alternatively, it will be apparent that the 1D sensor array may also be positioned substantially horizontally (not shown), thus enabling measuring azimuth. The 1D sensor array may be a specific sensor which function is only to be used in the determination of the depth and/or azimuth. Alternatively, the 1D sensor array may be part of the logging tool TL or the drilling assembly DA (see FIGS. 1.A and 1.B) which function is to determine the physical property of the zone surrounding the wellbore, e.g. the geological formation GF, the casing CS or the cemented casing. In this example, the sensor array SA1D comprises resistivity sensors and provides imaging of geological formation resistivity.

The depth and/or azimuth measuring device MD1 comprises an electronic arrangement EA comprising a memory buffer MEM coupled to a processing module PRO. The processing module PRO is coupled to the 1D sensor array (SA1D).

The method of measuring depth and/or azimuth of logging data DAM according to the invention will now be described in relation with FIGS. 2.B, 3.A, 3.B, 3.C and 7.

FIG. 2.B schematically shows a cross-section into a portion of a cased wellbore and illustrates two consecutive logging data frames measured by the measuring device MD1 shown in FIG. 2.A.

At a first instant $t_1$ a first logging data frame F11 corresponding to a first position of the sensor array SA1D is acquired (step S1—ACQ F1) and stored in the memory MEM.

A movement of the downhole assembly shown by arrows in FIG. 2.A may occur (step S2—MVT). Such a movement may be a rotation, a displacement or a combination thereof.

At a second instant $t_2$ a second logging data frame F12 corresponding to a second position of the sensor array SA1D is acquired (step S3—ACQ F2) and stored in the memory MEM.

Figure 3:
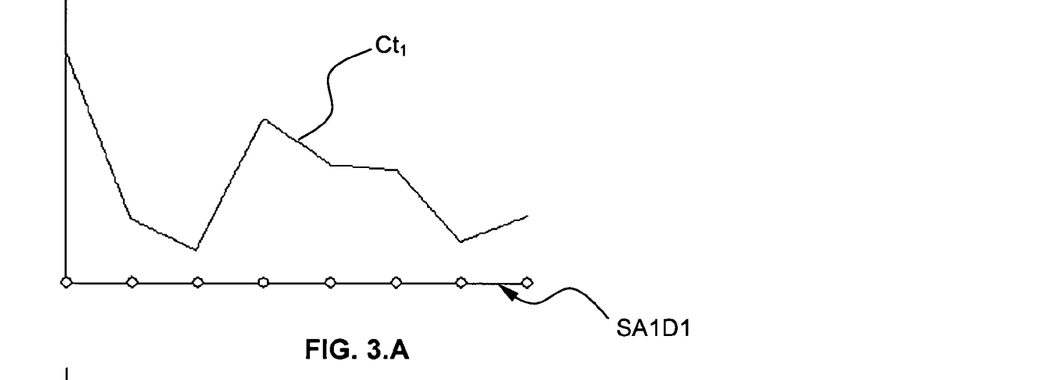

When the first F11 and second F12 logging data frames are separated by an integer number of full rotation of the measuring device MD1, the first F11 and second F12 logging data frames overlap at least partially each other, forming an overlapping area OA1 (also shown in FIG. 3.C).

FIG. 3.A schematically illustrates a first measurement curve $Ct_1$ relating to the first logging data frame F11, each measurement being performed by each of the 8 sensors of the 1D sensor array SA1D example of FIG. 2.A corresponding to the first position SA1D1 at the first instant $t_1$.

FIG. 3.B schematically illustrates a second measurement curve $Ct_2$ relating to the second logging data frame F12, each measurement being performed by each of the 8 sensors of the 1D sensor array SA1D example of FIG. 2.A corresponding to the second position SA1D2 at the second instant $t_2$.

FIG. 3.C schematically illustrates the best overlap between the first $Ct_1$ and the second $Ct_2$ measurement curves from which the relative change in the depth $\Delta DP$ can be derived (step S5—CALC $\Delta DP/\Delta AZ$). The best overlap can be determined by comparing the first $Ct_1$ and the second $Ct_2$ measurement curves (step S4—COMP F1/F2). This may be done by calculating, for various relative changes in the depth $\Delta DP$, the area between the curves OZ1, and determining the relative change in the depth $\Delta DP$ at which the area between the curves OZ1 is the most favorable. Advantageously, the best overlap is determined by applying a correlation or semblance method (e.g. a known auto-correlation, cross-correlation, or statistical correlation method, etc. . . . ). Optionally, the actual depth value DP can also be calculated based on the determined relative change in the depth $\Delta DP$ and a prior estimation of the depth (step S5—CALC DP/AZ).

The azimuth may be determined in an analogous way with a substantially horizontal sensor array and will not be further described.

As an alternative not represented in the drawings, it may be impossible to have a vertical line of sensors. Such a configuration may arise when the sensor size is relatively large, or when there are mechanical constraints to the position of the sensors within the downhole assembly. In this case, by monitoring the azimuth (e.g. with a magnetometer) while the downhole assembly is rotating, it is possible to synthesize a vertical line of data using a sensor array having a non-straight line configuration. After all the sensors have passed through one single azimuth, the measurement of each sensor may approximate the measurement that would have been taken by a vertical line of sensors. Subsequently, the depth measuring method of the invention may be applied in an analogous way as for a substantially vertical sensor array.

Figure 4:
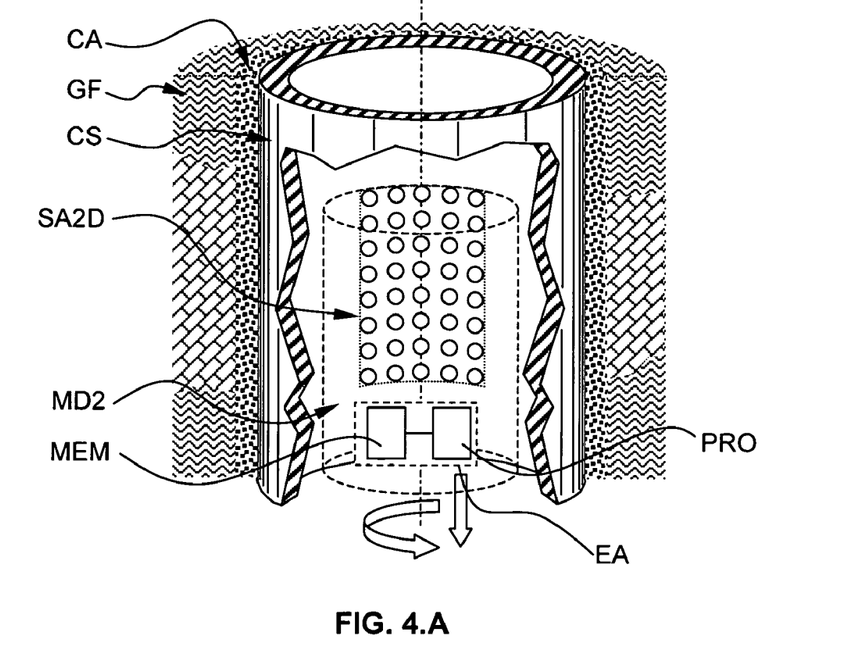

FIG. 4.A schematically shows a cross-section into a portion of a cased wellbore and illustrates the depth and/or azimuth measuring device MD2 according to a second embodiment of the invention.

The depth and/or azimuth measuring device MD2 is coupled to a 2D sensor array SA2D. In the example of FIG. 4.A, the 2D sensor array comprises a matrix of sensors enabling measuring depth and/or azimuth. The 2D sensor array may be a specific sensor which function is only to be used in the determination of the depth and/or azimuth. Alternatively, the 2D sensor array may be part of the logging tool TL or the drilling assembly DA (see FIGS. 1.A and 1.B) which function is to determine the physical property of the geological formation GF, casing or cementing CS. In this example, the sensor array SA2D comprises resistivity sensors and provides imaging of geological formation resistivity.

The depth and/or azimuth measuring device MD2 comprises an electronic arrangement EA comprising a memory buffer MEM coupled to a processing module PRO. The processing module PRO is coupled to the 2D sensor array SA2D.

The method of measuring depth and/or azimuth of logging data DAM according to the invention will now be described in relation with FIGS. 4.B, 5.A, 5.B and 7.

FIG. 4.B schematically shows a cross-section into a portion of a cased wellbore and illustrates two consecutive logging data frames measured by the measuring device MD2 shown in FIG. 4.A.

At a first instant $t_1$ a first logging data frame F21 corresponding to a first position of the sensor array SA2D is acquired (step S1—ACQ F1) and stored in the memory MEM.

A movement of the downhole assembly shows by arrows in FIG. 4.A may occur (step S2—MVT). Such a movement may be a rotation, a displacement or a combination thereof.

At a second instant $t_2$ a second logging data frame F22 corresponding to a second position of the sensor array SA2D is acquired (step S3—ACQ F2) and stored in the memory MEM.

The first F21 and second F22 logging data frames overlap at least partially each other, forming an overlapping area OA2. Preferably, between the first $t_1$ and second $t_2$ instant, the sensor array SA2D does not move such that the sensor array falls outside the boundaries of the first logging data frame F21 in order to enable overlapping. However, the second frame can be taken after one, or multiple rotations, provided that an overlapping area can be determined.

Figure 5:
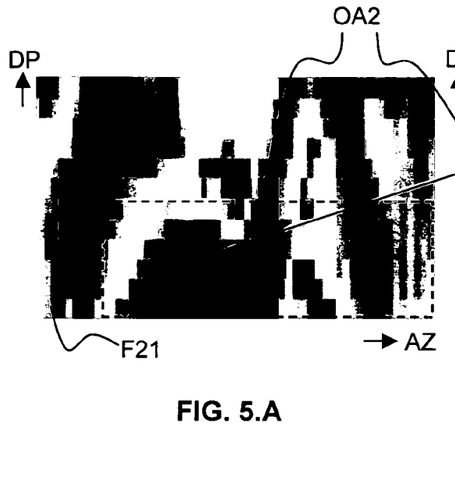

FIG. 5.A schematically illustrates a first logging data frame F21 measured by the sensors of the 2D sensor array SA2D corresponding to the first position at the first instant $t_1$.

FIG. 5.B schematically illustrates a second logging data frame F22 measured by the sensors of the 2D sensor array SA2D corresponding to the second position at the second instant $t_2$.

The bottom right area of the first logging data frames F21 is similar to the top left area of the second logging data frame F22. The overlapping area OA2 is delimited by a broken rectangle in FIGS. 5.A and 5.B. A correlation or semblance method is applied (step S4—COMP F1/F2) in order to precisely determine the locations of identical features in the two successive logging data frames. Then, the displacements of the features from frame-to-frame can be determined. When the best overlapping area is determined, the relative change in the depth $\Delta DP$ and in the azimuth $\Delta AZ$ can be calculated (step S5—CALC $\Delta DP/\Delta AZ$). Then the depth DP and azimuth AZ may be determined in a similar way as described in relation with the first embodiment (step S5—CALC DP/AZ).

The correlation or semblance method can be applied on the complete logging data frames, or alternatively on selected portion logging data frame extracted from said complete frames.

Optionally, other measurements may further correct (step S6—$DP=DP_0/AZ=AZ_0$) the estimation of the depth and/or the estimation of the azimuth as determined above.

As an example, with a sensor array of 8 electrodes having a dimension of about 3 inches, the relative position of the electrodes is known with a precision of 0.005 inch. This leads to a small error that keeps adding always in the same direction. A more important limitation causing the accumulation of errors is the resolution of the sensor around +/−0.2 inch.

The nature of the accumulated error results in a depth accuracy good at a short-scale, but deteriorated on a longer scale. In contrast, other measurements are good on long scales but have insufficient resolution on short scales. Therefore, the estimation of the absolute depth from the present invention can be improved by using an independent depth value $DP_0$ measured for example by a surface depth measuring system and/or a weight on tool measuring system. The absolute azimuth value may be improved by an independent azimuth value $AZ_0$ measured for example by a magnetometer. Long and short scale estimates can be combined using optimal known filtering/statistical methods Thus, the absolute depth and azimuth measurements can be enhanced on an absolute level.

Other measurements of displacement such as the use of accelerometers with double integration methods may also be used to achieve enhancement of the measurement. This adjustment can be made in real time if there is a communication between the surface equipment and the downhole assembly. This readjustment can also be made when the downhole assembly is returned to the surface and when both the surface and the downhole logging data are stored in a memory using the same time reference.

In logging while drilling applications, the standoff i.e. the distance from the sensor array to the wellbore wall may vary. This change in the standoff will result in a defocusing of the logging data frame that is measured. In such case, the correlation or semblance method needs to be able to correlate subsequent logging data frames even if the standoff has changed. Another measurement (e.g. an ultrasonic measurement) may assist to predict the amount of standoff and thereby give a prediction of amount of change in the logging data frames.

It is to be noted that in both embodiments hereinbefore described, the location of the sensor array in the downhole assembly is arbitrary. For example, the sensor array may be positioned into the downhole assembly, into a probe pad of a logging tool, on a stabilizer of a drilling tool. The position of sensor array mainly depends on the type of measurement (electromagnetic, nuclear . . . ), the necessity to perform measurements close to the geological formation, minimizing the influence of the standoff, etc. . . .

Further, in both embodiments, the calculation of the relative depth and/or azimuth values may be performed in the downhole assembly itself, e.g. by the processing module PRO, or by the surface equipment SE, e.g. by a computer, the measurements being stored in a memory of the tool and downloaded when the tool returns uphole.

Figure 6:
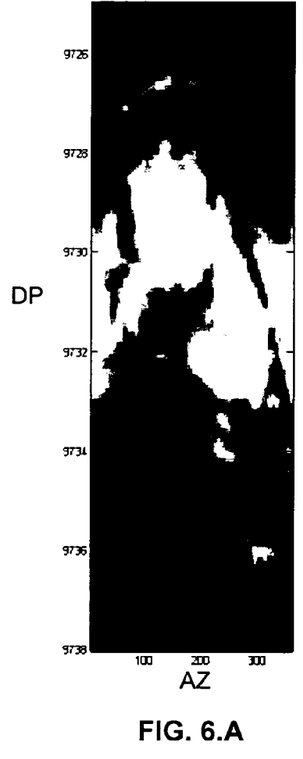
Figure 7:
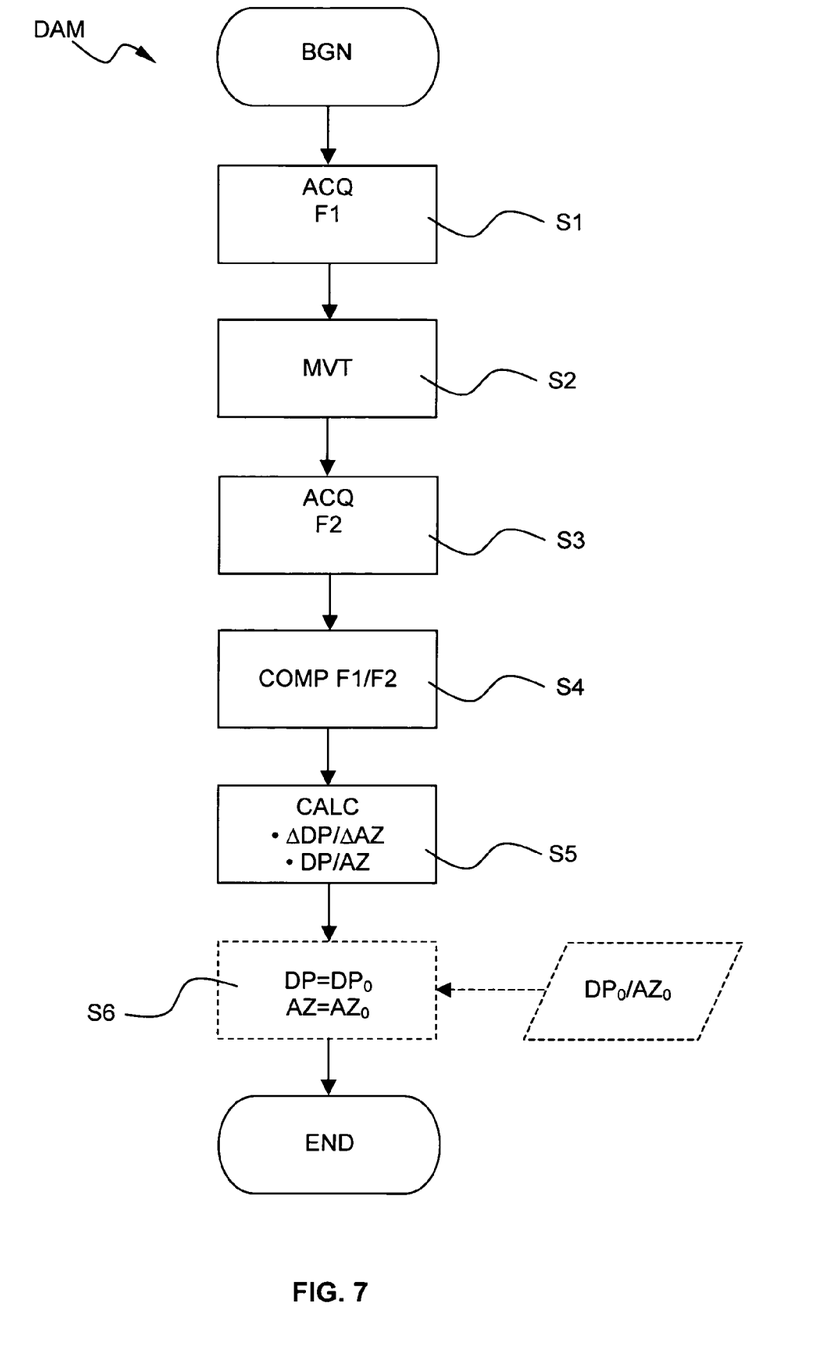
FIG. 7 is a block diagram illustrating the method of measuring depth and/or azimuth of logging data according to the invention.

FIGS. 6.A and 6.B show typical logging data image measured with a downhole assembly.

FIG. 6.B illustrates a logging data image measured with a downhole assembly where depth was measured according to the prior art. This image shows a range of depth between 9732 and 9734 feet where the downhole assembly did not move or move slower than estimated by the surface measuring device. However, this situation was not detected, resulting in a stretched region SR (represented by a broken line rectangle).

FIG. 6.A illustrates a logging data image measured with a downhole assembly where depth was measured according to the invention.

The logging data image of FIG. 6.A representing the resistivity of the geological formation for a depth DP interval and an azimuth AZ interval is obtained after the depth over a determined range of time has been calculated according to the invention, logging data frames and other data have been acquired during this determined range of time. With the invention, the case of downhole assembly not moving or slowly moving can be detected, thus preventing the stretched region that can be seen in prior art logging image.

Final Remarks

Though two embodiments with a particular 1D and 2D sensor arrays were described, it will be apparent for a person skilled in the art that the invention is also applicable with sensor array comprising any number of sensors and that may be positioned in any spatial distribution (regular distribution, staggered distribution . . . ). For example, the sensor of the array may be distributed according to a spiral like pattern.

The invention was described in relation with resistivity measurements. Nevertheless, it will be apparent for a person skilled in the art that the invention is also applicable to other kind of measurements from which it is possible to derive overlapping logging data frames, e.g. nuclear, ultrasonic or optical measurements, etc. . . .

Further, the invention is not limited to specific correlation or semblance methods, since there are many ways of comparing two curves or two images.

Though the invention was described in relation with onshore hydrocarbon well location, it will be apparent for a person skilled in the art that the invention is also applicable to offshore hydrocarbon well location. Finally, it will be apparent for a person skilled in the art that application of the invention to the oilfield industry is not limitative as the invention can also be used in others types of surveys.

The drawings and their description hereinbefore illustrate rather than limit the invention.

Any reference sign in a claim should not be construed as limiting the claim. The word "comprising" does not exclude the presence of other elements than those listed in a claim. The word "a" or "an" preceding an element does not exclude the presence of a plurality of such element.

The invention claimed is:

1. A method of measuring depth and/or azimuth of logging data, the logging data being related to at least one property of a zone surrounding a wellbore and being measured by at least one sensor array, the method comprising the steps of:
    acquiring and storing a first logging data frame corresponding to a first position of the sensor array, and
    acquiring and storing a second logging data frame corresponding to a second position of the sensor array,
wherein the first and second position are such that the second logging data frame overlaps at least partially the first logging data frame, and
wherein the method further comprises the steps of:
    comparing the first and second logging data frame with a computer, and
    determining a relative change in the depth and/or azimuth of logging data measured by the sensor array between the first and second logging data frame.

2. A method of measuring depth and/or azimuth according to claim 1, wherein the method further comprises the step of calculating an actual depth value and/or an actual azimuth value of logging data based on the relative change in the depth and/or azimuth of logging data and a prior estimation of the depth and/or azimuth of logging data.

3. A method of measuring depth and/or azimuth according to claim 1, wherein the step of comparing the first and second logging data frame includes determining an overlapping area, between both logging data frames.

4. A method of measuring depth and/or azimuth according to claim 3, wherein the step of determining the overlapping area includes evaluating the coherence of the logging data frames by applying a correlation method on both logging data frames.

5. A method of measuring depth and/or azimuth according to claim 3, wherein the step of determining the overlapping area includes evaluating the similarity of the logging data frames by applying a semblance method on both logging data frames.

6. A method of measuring depth and/or azimuth according to claim 1, wherein the method further comprises correcting the prior estimation of the depth and/or the prior estimation of the azimuth of logging data based on a measurement made by a surface depth measuring system or a weight on tool measuring system.

7. A method of measuring depth and/or azimuth according to claim 1, wherein the logging data are mechanical, electromagnetic, nuclear, acoustic or ultrasonic measurements.

8. A method of measuring depth and/or azimuth according to claim 1, wherein the first and second logging data frames are 1D images or 2D images.

9. The method according to claim 1, wherein the measuring is carried out by a non-transitory computer readable medium containing computer instructions stored therein for causing a computer processor to perform a program for a depth and/or azimuth measuring device arranged to be deployed into a wellbore, the program comprising a set of instructions that, when loaded into a program memory of the depth and/or azimuth measuring device, causes the depth and/or azimuth measuring device to carry out the steps of the method of measuring depth and/or azimuth of logging data.

10. A device for measuring depth and/or azimuth of logging data, the device being coupled to at least a sensor array for measuring logging data related to at least one property of a zone surrounding a wellbore, and comprising a memory buffer and at least one processing module, wherein the processing module of the depth and/or azimuth measuring device is arranged to:

acquire and store into the memory buffer a first logging data frame corresponding to a first position of the sensor array and a second logging data frame corresponding to a second position of the sensor array, the second logging data frame overlapping at least partially the first logging data frame, compare the first and second logging data frame, and calculate a relative change in the depth and/or azimuth of logging data between the first and second logging data frame.

11. A device for measuring depth and/or azimuth according to claim 9, wherein the processing module of the depth and/or azimuth measuring device is further arranged to calculate an actual depth value and/or an actual azimuth value of logging data based on the relative change in the depth and/or azimuth of logging data and a prior estimation of the depth and/or azimuth of logging data.

12. A device for measuring depth and/or azimuth according to claim 9, wherein the sensor array is a 1D sensor array or a 2D sensor array.

13. A device according to claim 9, wherein the device is part of one of a drilling assembly and a logging tool.

* * * * *